United States Patent Office 2,827,395
Patented Mar. 18, 1958

2,827,395

PROCESS FOR COATING A GAS FILTER

Terence B. Jordan and John P. Dilworth, Fishkill, N. Y., and Richard C. Givens, Port Arthur, Tex., assignors to The Texas Company, New York, N. Y., a corporation of Delaware No Drawing. Application April 11, 1955
Serial No. 500,642

3 Claims. (Cl. 117—98)

This invention relates to a superior polyethylene-containing composition, a process of making a gas filter employing the superior polyethylene-containing composition and the gas filter consisting of a foraminous material coated with the polyethylene-containing composition.

Polyethylene-thickened lubricating oils have found use as a coating for air filters used in internal combustion engines and air conditioning apparatus but have had the serious drawback that their thixotropic gel-like nature makes their application difficult. It is necessary to heat the thick gels of the prior art to a high temperature of about 200° F. in order to obtain sufficient fluidity for application. The high temperatures necessary to convert the gelatinous polyethylene-thickened composition to a consistency suitable for application have been hazardous and have necessitated the use of special equipment to prevent accidents. The present invention provides a polyethylene-thickened composition which is fluid at room temperatures and which is converted to a gel when applied to the foraminous structure of the gas filter.

The polyethylene-thickened lubricant composition of this invention is fluid at temperatures of 60 to 110° F. and comprises an oleaginous hydrocarbon lubricating oil as the major component and 2 to 3.5 weight percent polyethylene having a molecular weight between 15,000 and 30,000. The average particle size of the polyethylene in the fluid lubricant composition is at least 10 microns. The average particle size is usually between 15 and 75 microns. The large average particle size of the polyethylene is the major factor in determining the fluid nature of the polyethylene-thickened lubricant composition. A fluid composition is obtained by limiting the cooling rate during preparation of the composition to a rate less than 10° F. per minute and preferably to a rate less than 5° F. per minute until a temperature of about 150° F. is reached during the cooling of the polyethylene-containing composition.

The superior gas filter of this invention comprises a foraminous material to which the fluid polyethylene-containing composition having an average polyethylene particle size more than 10 microns is applied with the resulting conversion of the polyethylene-thickened lubricating oil to a gelatinous thixotropic composition on the foraminous material. During application of the fluid polyethylene composition, the average polyethylene particle size is reduced to less than 2 microns and a gel-like thixotropic composition is formed in situ on the foraminous material. The resulting gas filter has improved wicking properties, higher dirt capacity, better water separation and greater effectiveness as measured by percent dirt removed from a specific volume of air. The process by which a superior gas filter of this type is made is also within the purview of this invention.

The change in nature of the polyethylene composition, that is, the change from a fluid to a gel during application, is directly related to the change in particle size of the polyethylene in the composition before and after application. Methods of application which result in this change in particle size are: (1) spraying the fluid composition through an orifice onto the foraminous structure and (2) applying to the foraminous material fluid polyethylene-containing composition which has been heated to a temperature above about 160° F. Both of these methods, which will be described in more detail hereafter, result in a change of the fluid composition to a gelatinous one on the foraminous structure of the gas filter.

The invention will be described by first describing in detail the fluid polyethylene-containing composition and its method of manufacture and thereafter describing the novel gas filter and its method of manufacture.

There are 3 major advantages involved in the use of the fluid composition of this invention in manufacturing gas filters. First, the fluid polyethylene-containing lubricant composition is more easily applied than the prior art product since it can be applied either by spraying at atmospheric temperature or by heating to a temperature well below the 200° F. temperature required for prior art products. The hazards accompanying the higher temperatures required for application of the prior art products are minimized by the use of this product.

Secondly, the fluid composition of this invention has better water separation characteristics than prior art products and is substantially foam-free. The better water separation and freedom from foam are apparently corollary properties which are instrumental in imparting longer life and better dirt removing efficiency to the composition of this invention.

The third and perhaps the most important advantage is that the gas filter prepared in this invention is more effective in removing dirt from a given volume of air and has a higher dirt capacity, that is, an ability to hold a bigger dirt load. The superior effectiveness of the gas filter is believed to be a function of the better wicking, water separation and antifoaming properties of the fluid composition of this invention. A gas filter coated with a composition containing 2.5 percent polyethylene by the process of the invention has better dirt removal properties than a gas filter coated with the normally gelatinous lubricant composition containing the same concentration or even higher concentrations of polyethylene. In view of the relatively high cost of polyethylene compared with the lubricating oil base, this is an important factor in the production of more economical gas filters.

The fluid polyethylene-containing lubricant composition of this invention is prepared by heating the polyethylene in about ½ of the base oil to a temperature between 280 and 350° F. until a clear solution is obtained, indicating complete dissolution of the polyethylene. The base oil containing dissolved polyethylene is then cooled at a rate more than 0.5° F. and less than 10° F. per minute and preferably at a rate between 1 and 5° F. per minute by direct heat exchange and by addition of the remainder of the oil. The cooling rate reaches its maximum in the period in which the remainder of the base oil is added to the composition but never exceeds 10° F. per minute. In commercial equipment, the cooling rate is usually between 3 and 5° F. per minute during addition of oil and between 1 and 3° F. per minute when the cooling is being effected by indirect heat exchange alone. If cooling rates higher than those specified are used, the particle size of the polyethylene in the lubricant composition is substantially reduced with the result that a gelatinous product rather than a fluid product is obtained.

The polyethylene constitutes between 2 and 3.5 weight percent of the total composition. The exact percentage to be employed is generally determined by the molecular weight. In general it can be stated that the higher the molecular weight the lower the polyethylene concentration to yield a composition of desired fluidity. A preferred concentration for polyethylene of an average molecular weight between 20,000 and 25,000 is about 2.5 weight percent.

The polyethylene must have an average molecular weight between 15,000 and 30,000 in order to produce a fluid material which is converted to a gelatinous material when applied to the gas filter. When the polyethylene has a molecular weight below 15,000, for example in the neighborhood of 12,000, the resulting product exhibits substantially no gelling action when applied to a gas filter even though the concentration of polyethylene is 3 weight percent of the composition. The upper limit of 30,000 is dictated by the fact that polyethylenes higher than this range are not soluble to the necessary extent in lubricating oils. It has been found that the preferred molecular weight range is between 20,000 and 25,000.

The major requirement of the hydrocarbon base oil is that its flash point be above 350° F. which is the minimum temperature set by the Association of American Railroads for products to be used in air filters on diesel engines. Other than this limitation, the material can be a paraffin base oil, a naphthene base oil or a mixed paraffin-naphthene base product. Normally, the base oil is a distillate oil rather than a residual oil. A preferred base oil is a naphthene base distillate oil having an SUS viscosity at 100° F. of about 300, a flash of 375° F., a pour of <—20° F. and a VI of about 16. The base oils are usually subjected to a refining procedure such as acid treatment and solvent refining.

The resulting polyethylene-thickened lubricant composition is best defined as being fluid at temperatures of 60 to 110° F. It is not feasible to define accurately the viscosity of the product by means of either Saybolt Universal or Saybolt Furol because of the effect of temperature on viscosity, with the result that repeatability of the Saybolt Furol or Saybolt Universal viscosities is very poor. Accordingly, the best method of defining the viscosity of the materials is to say it is fluid at atmospheric temperatures of 60 to 110° F. The composition is amber in color and has a specific gravity at 60° F. of about 0.925 and an SSU viscosity at 210° F. between 120 and 150. The SSU viscosity at 210° F. can be correlated with the concentration of polyethylene and is used as a manufacturing control.

A superior gas filter is formed by the application of the fluid polyethylene-containing composition of this invention to a foraminous material in a manner such that the particle size of the polyethylene is reduced to less than 2 microns from more than 10 microns with the resulting conversion of the composition to a gelatinous thixotropic material. As a consequence, the gas filter comprises a foraminous material coated with a composition comprising a major portion of a lubricant and 2 to 3.5 weight percent polyethylene having an average particle size less than 2 microns. The average particle size of the polyethylene in the lubricant composition after application to the foraminous material is usually around 0.5 to 1 micron. It is believed that the gel structure is formed by the attraction between the finely-divided polyethylene particles of a particle size less than 2 microns, whereas when the average particle size of the polyethylene is above 10 microns there is not sufficient effective concentration of polyethylene particles to form a gel-like structure.

There are two main methods of applying the fluid polyethylene composition to the gas filter to assure the conversion of the fluid composition to a gelatinous structure in situ on the gas filter. One procedure involves spraying the fluid composition onto the foraminous structure at substantially atmospheric conditions. Apparently the shearing action involved in spraying a material of this nature causes the polyethylene aggregates in the fluid composition to be subdivided into smaller particles with the result that a gelatinous composition is deposited upon the gas filter. The spray technique is very convenient where equipment for heating the composition is not available.

The method of application which results in the formation of the most efficient gas filter involves heating the fluid composition to a temperature about 160° F. or somewhat above, and applying the hot composition to the gas filter by any one of a variety of methods. The hot composition can be applied by dipping the foraminous structure into the hot fluid or by spraying, brushing or pouring it onto the foraminous material.

The rapid chilling of the polyethylene-containing composition, which occurs on the extended surface of the filter structure, is substantially greater than a rate of 10° F. per minute with the result that a gelatinous thixotropic composition is formed in situ on the gas filter apparatus. It is theorized that the rapid chilling which takes place on the extended surface of the gas filter causes a reduction of polyethylene particles to an average particle size less than 2 microns and the formation of a gel-like coating on the gas filter apparatus. This mode of application has the advantage of effecting better penetration into the interior of the gas filter than the spray technique.

Regardless of the mode of formation, the gas filters of this invention are superior to the prior art gas filters coated with a polyethylene-containing lubricant composition which is gelatinous at room temperature prior to application.

In the following examples, the production of the fluid polyethylene-containing lubricant composition and its application to the foraminous structures to form superior gas filters are demonstrated. Example I shows laboratory production whereas Example II shows plant production.

*Example I*

A naphthene base distillate oil, having an SUS viscosity at 100° F. of about 312, a flash COC above 375° F., a pour of less than —20° F., in an amount of 30 lbs. and 1.3 lbs. of polyethylene in the form of a fine powder and having an average molecular weight of 23,000, were added to a steam-jacketed kettle. This mixture was heated to a temperature between 300 and 350° F. and was held there until all of the polyethylene was dissolved. After all the polyethylene had been added, the mixture was slowly cooled at a rate of about 2° F. per minute by circulating water through the kettle jacket. When the temperature reached about 240° F., the remainder of the oil, that is 20.7 lbs., was added while the indirect cooling was continued. The rate of cooling during the addition of the oil was approximately 4° F. per minute. The product which was withdrawn from the kettle at a temperature of about 100° F., was completely fluid at atmospheric conditions and was an amber-colored material. This fluid product was sprayed on the foraminous structure of a gas filter and was converted to a gelatinous composition in situ on the foraminous material. The gas filter formed in this manner is under test in operation of a diesel engine for more than four months and has given very satisfactory service.

*Example II*

5600 lbs. of the naphthene base distillate oil used in Example I and 280 lbs. of polyethylene in the form of pellets and having an average molecular weight of 23,000 were added to a steam-jacketed kettle. This mixture was heated to a temperature between 290° and 310° and was held there until all of the polyethylene was dissolved. After all the polyethylene had been added, the mixture was slowly cooled at a rate of about 1° F. per minute by circulating water through the kettle jacket. When the temperature reached about 230° F., the remainder of the oil, that is 5600 lbs., was added while the indirect cooling was continued. The rate of cooling during the addition of the oil was approximately 4° F. per minute. The product which was withdrawn from the kettle at a temperature of about 100° F., was completely fluid at atmospheric conditions and was an amber-colored material. This product had the following properties:

Visc. SUS/210° F. _____ 141.2
Visc. SFS/122° F. _____ 168 ck. 169
Specific gravity 60/60_____ 0.9254
Flash, O-Cleve., ° F._____ 360
Fire, Cleve., ° F._____ 410
Pour, ° F._____ +5
Color, ½" Lovibond_____ 40

This fluid product was sprayed on the foraminous structure of a gas filter and was converted to a gelatinous composition in situ on the foraminous material. The gas filter formed in this manner has been tested in operation of four diesel engines for more than four months and has given very satisfactory service.

Another portion of the fluid composition prepared as above described was heated to a temperature about 160° F. and a foraminous structure was then dipped into the hot mixture so that it was completely covered. When the gas filter was withdrawn from the hot mixture and allowed to cool, there set up thereon a gelatinous composition which was non-fluid at room temperature. The gas filter formed in this manner has given very efficient service in use in railway diesel service for a period over 8 months.

*Example III*

The naphthene base distillate oil of Example I and polyethylene were added to a kettle in the same proportions as in Example I. The mixture of lube oil and polyethylene was heated to a temperature of about 375° F. until all the polyethylene was dissolved and then cooled at a rate of better than 13° F. per minute by circulating through an external exchanger, containing a shear valve, in conjunction with addition of lubricating oil to a temperature of about 265° F. Circulation through the external system was continued to a temperature of 130° F. The resulting product was a thixotropic gel in which the polyethylene particles had an average particle size of about 1 micron. This product cannot be sprayed onto a gas filter and is usually applied at a temperature of about 200° F.

The fluid polyethylene composition of this invention can be used in the formation of gas filters of all types. The most common use of the material of this invention is in the production of gas filters for diesel engines, but it finds application in the production of gas filters for the automotive industry and for the air-conditioning industry.

Obviously, many modifications and variations of the invention, as hereinbefore set forth, may be made without departing from the spirit and scope thereof, and therefore, only such limitations should be imposed as are indicated in the appended claims.

We claim:

1. A process for preparing a gas filter which comprises adding 2.0 to 3.5 weight percent, based on the final liquid composition, of polyethylene having a molecular weight between 15,000 and 30,000 to a mineral lubricating oil having a flash point above 350° F., heating the mixture of polyethylene and mineral lubricating oil to a temperature between 280 and 350° F. to dissolve said polyethylene, cooling said mixture at a rate between 0.5 and 10° F. per minute to obtain a substantially foam-free liquid composition wherein the average particle size of the polyethylene is between 10 and 75 microns and which remains fluid at temperatures of 60 to 110° F. and applying said liquid composition to a foraminous material in a manner to convert said fluid composition applied to said foraminous material to a thixotropic gel having an average polyethylene particle size less than 2 microns with the resulting formation of a gas filter having both dirt removal effectiveness and ability to hold a higher dirt load than the similar gas filter obtained by impregnating said foraminous material with a lubricating oil-polyethylene composition which is a thixotropic gel at temperatures below 200° F.

2. A process according to claim 1 in which said fluid composition is applied to said foraminous material by spraying through an orifice at substantially atmospheric temperature.

3. A process according to claim 1 in which said fluid composition is applied to said foraminous material at a temperature above about 160° F. to below 200° F., the desired particles size change being effected as the fluid composition cools on said foraminous material.

References Cited in the file of this patent

UNITED STATES PATENTS

| | | |
|---|---|---|
| 2,062,090 | Gaarder et al. | Nov. 24, 1936 |
| 2,384,848 | Peters | Sept. 18, 1945 |
| 2,627,938 | Frohmader et al. | Feb. 10, 1953 |
| 2,789,093 | Foehr | Apr. 16, 1957 |